No. 877,488.
A. F. CLARK.
RUNNING GEAR.
APPLICATION FILED NOV. 9, 1907.
PATENTED JAN. 28, 1908.
3 SHEETS—SHEET 1.
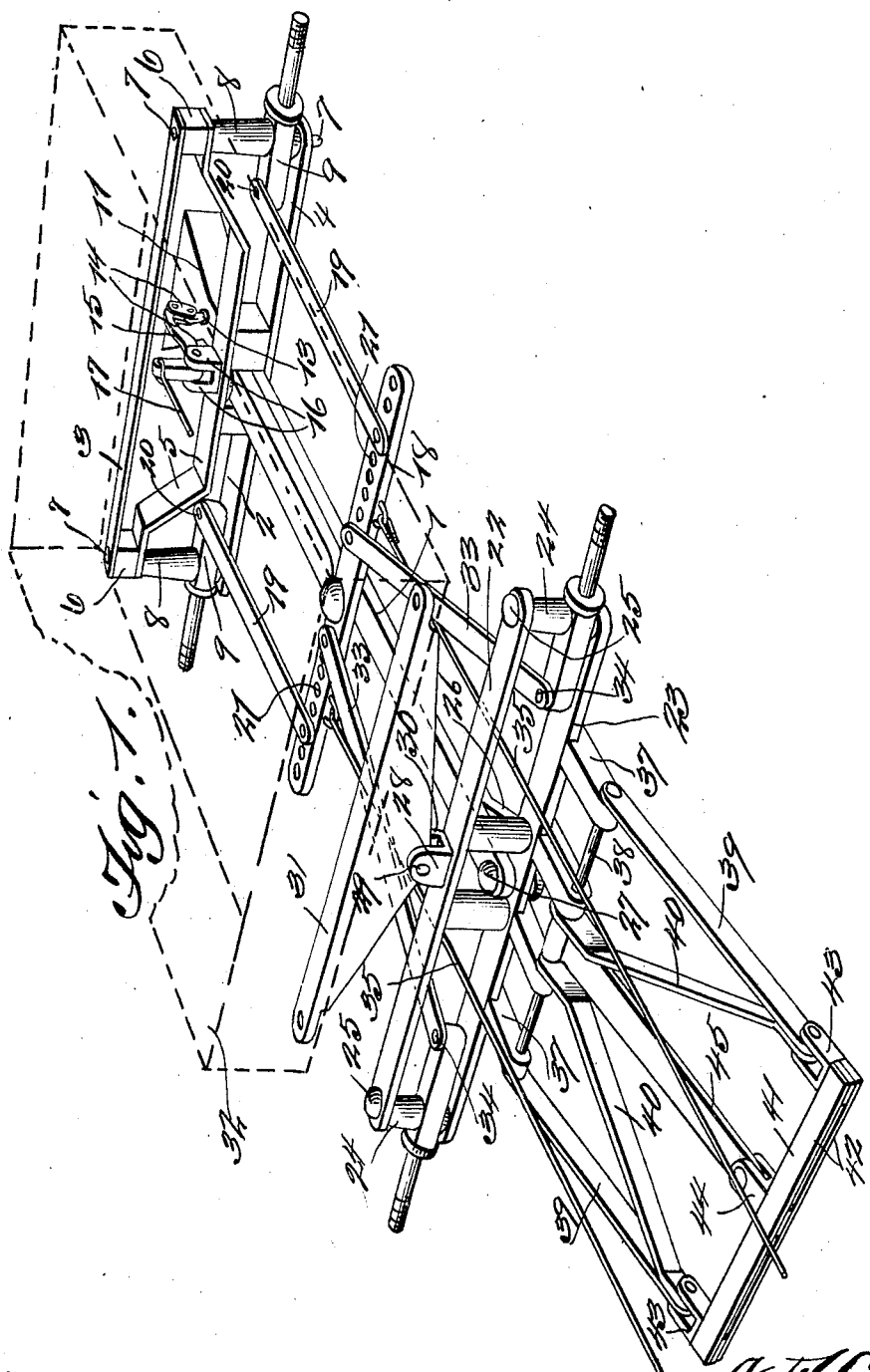
Witnesses
F. G. Boswell.
M. O. Bowling.
Inventor
A. F. Clark,
By D. Swift & Co.
Attorneys No. 877,488. PATENTED JAN. 28, 1908.
A. F. CLARK.
RUNNING GEAR.
APPLICATION FILED NOV. 9, 1907.
3 SHEETS—SHEET 2.
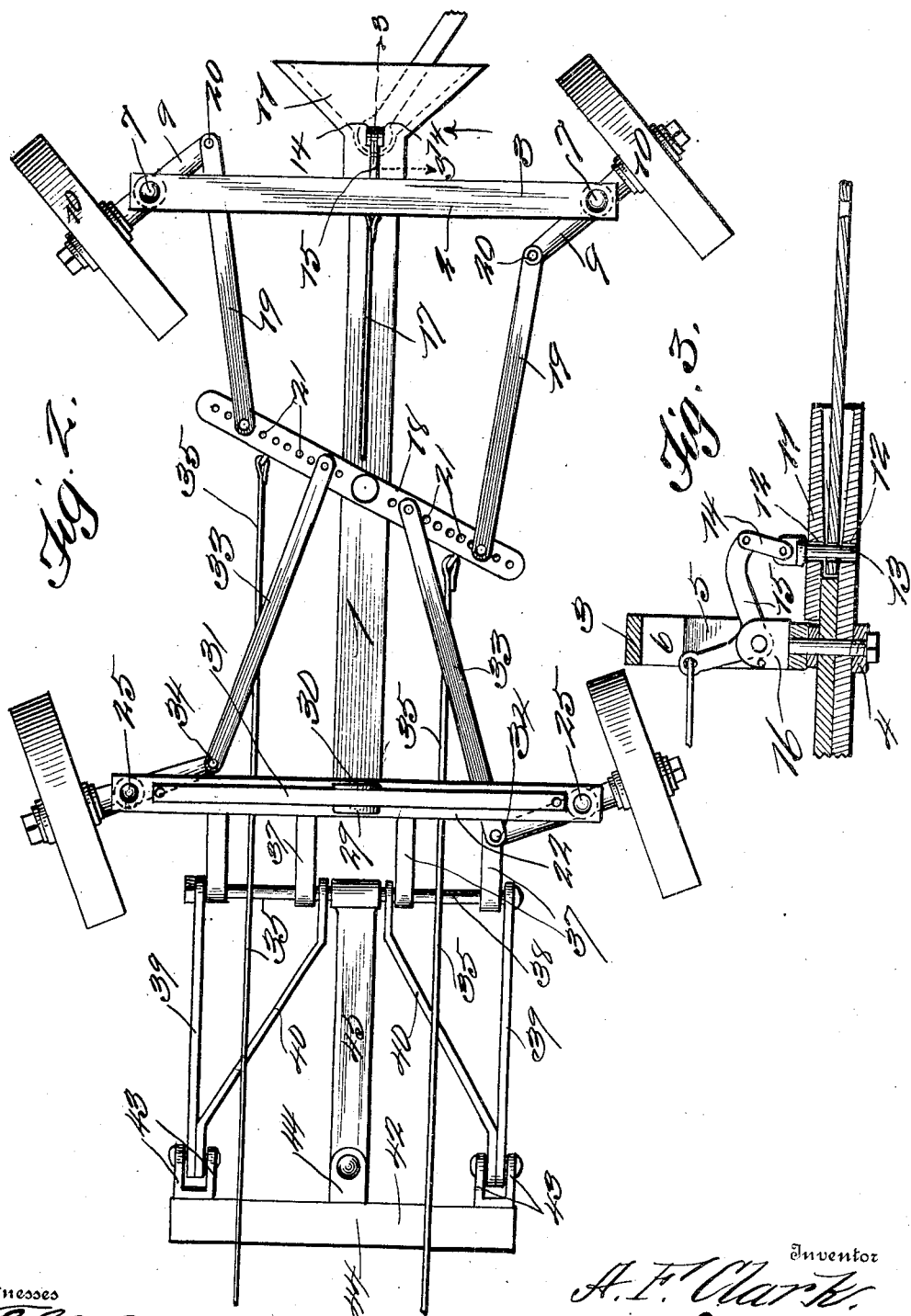

No. 877,488.  
A. F. CLARK.  
RUNNING GEAR.  
APPLICATION FILED NOV. 9, 1907.
PATENTED JAN. 28, 1908.
3 SHEETS—SHEET 3.
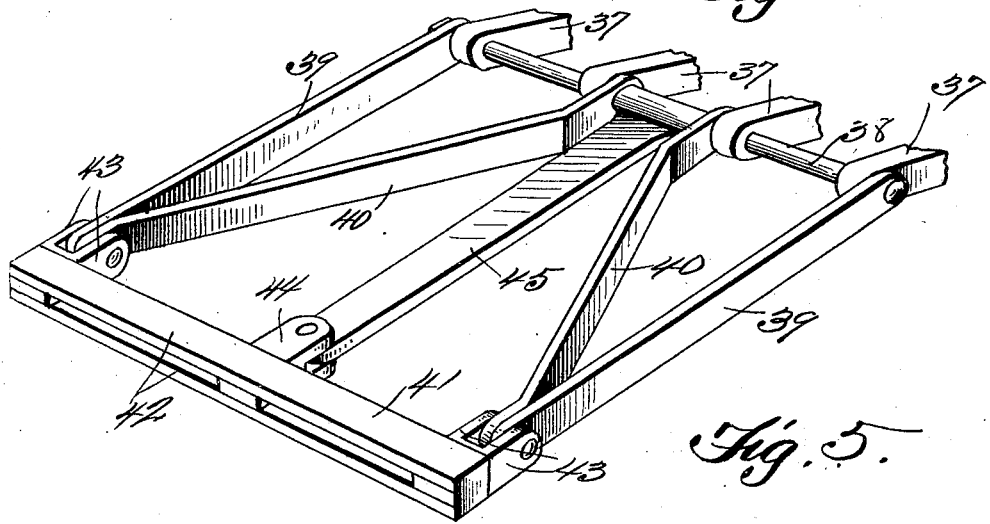
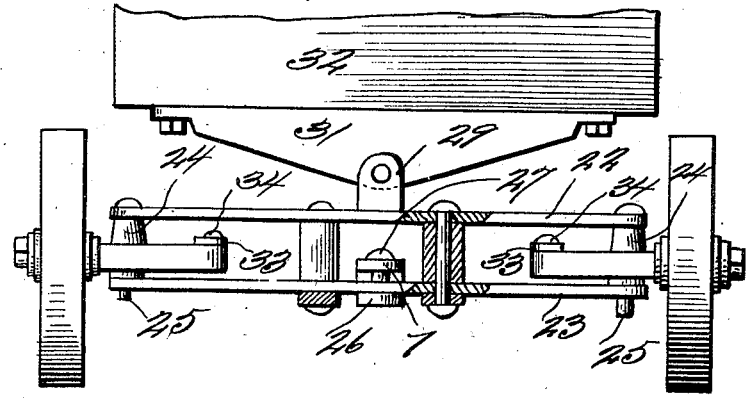
Witnesses  
Inventor  
A. F. Clark  
By D. Swift &Co.  
Attorneys

UNITED STATES PATENT OFFICE.

ARTHUR F. CLARK, OF CASHION, OKLAHOMA.

RUNNING-GEAR.

No. 877,488.

Specification of Letters Patent.

Patented Jan. 28, 1908.

Application filed November 9, 1907. Serial No. 401,377.

*To all whom it may concern:*

Be it known that I, ARTHUR F. CLARK, a citizen of the United States, residing at Cashion, Oklahoma, have invented a new and useful Running-Gear; and I do hereby declare the following to be a full, clear, and exact description of the invention, such as will enable others skilled in the art to which it appertains to make and use the same.

This invention pertains to a new and useful running gear, especially adapted for use in connection with tenders, and the invention in its broadest scope has for its most particular and essential object to provide a device of this character, by which the front wheels of the tender will follow the rear wheels of an engine, and the rear wheels of the tender will follow the front wheels of the engine, as will be hereinafter readily manifest.

The invention aims as a further object to provide guiding rods, the forward ends of which being connected to the axle of the forward wheels of an engine, while the rear ends of said rods are connected to an oscillating bar of the running gear, which have rod connections with the stub axles of the rear wheels of the running gear; the oscillating bar is provided with a plurality of apertures so as to allow the rods connecting the stub axles to be interchanged, so as to regulate and equalize the oscillatory movement of said stub axles, correlative with the forward wheels of the running gear and the wheels of an engine, as will be clearly evident.

The invention aims as a further object to provide a flexible frame, for the connection of the forward wheels of the running gear with the rear of an engine, and a still further object of the invention dwells in a new and novel coupling device, carried by the rear of the running gear, to which an object to be drawn may be connected, for instance a thresher; this coupling device is operated by a suitable rod which is pivotally connected to a lever upon the platform of an engine, (not shown), as will be readily understood.

This invention comprises further objects and combinations of elements which will be hereinafter more fully described, shown in the accompanying drawings, and the novel features thereof will be pointed out by the appended claims.

The features and elements and arrangement thereof, for accomplishing the several objects of the invention, may be changed and varied, that is to say, in a practical application of the apparatus, with an understanding that the changes and variations accruing from said application are limited to the scope of the appended claims.

To obtain a full and correct understanding of the details of construction, combinations of features, elements and advantages, reference is to be had to the hereinafter set forth description and the accompanying drawings in connection therewith, wherein Figure 1 is a perspective view of the running gear embodying the principal features of the invention. Fig. 2 is a top plan view of the running gear, illustrating the different positions of the several parts of the apparatus, with relation to the oscillatory stub axles. Fig. 3 is a sectional view on line 3—3 of Fig. 2, clearly illustrating the construction of the coupling device. Fig. 4 is a perspective view of the flexible frame carried by the forward portion of the running gear. Fig. 5 is a front elevation of the forward portion of the running gear, showing the flexible frame removed, and clearly illustrating the pivotal connection between the tender and the running gear. Fig. 6 is a sectional view taken through members 3, 4 and 5, the hollow extension 8 and a portion of the stub axle 9.

Like reference characters are utilized to indicate the different features and elements of the invention, throughout the several views of the drawings.

In regard to the accompanying drawings, wherein like reference characters indicate corresponding parts in the several illustrations, by figures, 1 designates the reach of the running gear, adjacent to the rear ends of which the rear axle 2 of the apparatus is rigidly connected; this rear axle comprises three members, an upper and lower member 3 and 4, and an intermediate member 5, between which intermediate member and the lower member the said reach is fixed, as clearly shown. Between the intermediate member and the upper member and at their outer ends, spacing blocks 6 are fixed, through which pivot bolts or rods 7 extend. These pivot bolts or rods also extend through hollow extensions 8, carried by the oscillatory stub axles 9, so as to form a pivot for said stub axles; the lower ends of the said pivot bolts or rods have bearings in the lower member 4 of the said rear axle, as clearly illustrated in the drawings. The said stub axles are provided with wheels 10, as clearly shown in Fig. 2.

The rear of the reach 1 terminates into a coupling member 11, of a triangular contour, as shown in Fig. 2. Mounted to have vertical movement in apertures 12 in the upper and lower portions of the coupling member, is a pin 13, to the upper end of which the links 14 are connected, which have pivotal connections with one arm of a bell crank lever 15, which is pivotally mounted between lugs 16, fixed to the intermediate member of the rear axle, as clearly shown in Fig. 1. Connected to the other arm of the bell crank lever is a rod 17, which, in practice, is adapted to be connected to a lever, (not shown), upon the platform of an engine, (not shown), as will be readily understood. By operating the lever, carried by the engine, (not shown), the pin 13 is raised or lowered, to disconnect or connect, the same, to a coupling link of an object to be drawn, (not shown), as will be clearly observed.

Pivoted approximately at the center of the reach 1 is an oscillatory bar 18, the outer ends of which are pivotally connected to bars 19, which are in turn pivoted to the said stub axles, as at 20. The said oscillatory bar 18 is provided with a plurality of apertures 21, so as to interchange the pivotal connections of the bars 19, so as to regulate and equalize the oscillatory movement of the said stub axles, correlative with the forward wheels of the running gear and the wheels of the engine.

The forward axle of the apparatus comprises an upper and lower member 22 and 23, between the outer ends of which the forward oscillatory stub axles are pivoted, upon which the forward wheels are mounted, as clearly shown. The said stub axles are provided with hollow upwardly projecting members 24 through which the pivot bolts or rods 25 extend, as clearly shown in Figs. 2 and 5. The forward end of the reach is provided with a clamping plate 26, between which and the said reach the lower member 23 of the forward axle is pivoted, by means of the bolt 27, as clearly shown in Figs. 1 and 5. Pivoted to the upper member 22 of the forward axle is a clip 28, comprising ears 29 and 30, between which the bolster 31 is pivoted, which bolster is fixed to the tender 32, as clearly shown in Fig. 1 by the dotted lines.

The oscillatory bar 18 has pivoted thereto a pair of bars or rods 33, which are pivotally connected to the forward oscillatory axles, as at 34, as clearly shown in Figs. 1 and 2. Also pivoted to the oscillatory bar 18 are a pair of rods 35, of considerable length, which are adapted to be connected to the axle of the forward wheels of an engine, (not shown), as will be clearly evident.

The lower member 23 of the forward axle is provided with a plurality of projections, extending forwardly of the running gear, in which projections 37, a shaft 38 is journaled, upon which the bars 39 and the angularly disposed bars 40 are pivoted loosely, so as to allow the same to have slight flexible movements relative to the said shaft 38, as will be clearly manifest. Pivoted to these bars 39 and 40 is a metallic member 41, composed of a pair of beams 42 and the ears 43 and 44, between which ears 43 the bars 39 and 40 are pivoted, as clearly shown; the pivotal connections between the ears and the said bars 39 and 40 are of such a character as to allow the member 41 to have a slight flexile movement, as will be clearly observed.

Pivoted upon the shaft 38 and between the angularly disposed bars is a bar 45, one end of which is pivoted between the ears 44 of the member 41, so as to also allow the member 41 to have a slight movement, as will be clearly seen upon an inspection of the drawings. From the foregoing, the essential features, elements and the operation of the device, together with the simplicity thereof, will be clearly apparent.

Having thus fully described the invention, what is claimed as new and useful by the protection of Letters Patent, is:—

1. In a device as set forth, a reach having fixed to the rear end thereof an axle having pivoted stub axles, said reach having pivoted to its forward end a forward axle comprising an upper and lower member spaced apart, stub axles pivoted between said members, tubular elements for holding the members spaced apart, said forward axle having pivoted thereto a flexible frame, and means coöperating between the stub axles for regulating and equalizing the oscillatory movements of said stub axles.

2. In a device as set forth, a reach having fixed to the rear end thereof an axle having pivoted stub axles, said reach having pivoted to its forward end a forward axle comprising an upper and lower member spaced apart, stub axles pivoted between said members, tubular elements for holding the members spaced apart, said forward axle having pivoted thereto a flexible frame, and adjustable means coöperating between the stub axles for regulating and equalizing the oscillatory movements of said stub axles.

3. In a device as set forth, a reach having fixed to the rear end thereof an axle having pivoted stub axles, said reach having a forward axle comprising an upper and lower member spaced apart, said lower member being pivoted to the said reach, stub axles pivoted between said members, tubular elements for holding the members spaced apart, said forward axle having pivoted thereto a flexible frame, and means coöperating between the stub axles for regulating and equalizing the oscillatory movements of said stub axles.

4. In a device as set forth, a reach having fixed to the rear end thereof an axle having pivoted stub axles, said reach having a forward axle comprising an upper and lower member spaced apart, said lower member being pivoted to the said reach, stub axles pivoted between said members, tubular elements for holding the members spaced apart, said forward axle having pivoted thereto a flexible frame, and adjustable means coöperating between said stub axles for regulating and equalizing the oscillatory movements of said stub axles.

5. In a device as set forth, a reach having fixed to the rear end thereof an axle having pivoted stub axles, said reach having a forward axle comprising an upper and lower member spaced apart, said lower member being pivoted to the said reach, said upper member having a pivoted bolster so as to oscillate vertically and parallel with the forward axle, stub axles pivoted between said members, tubular elements for holding the members spaced apart, said forward axle having pivoted thereto a flexible frame, and means coöperating between the stub axles for regulating and equalizing the oscillatory movements of said stub axles.

6. In a device as set forth, a reach, a rear axle fixed thereto comprising an upper and lower member and an intermediate member having its outer portions angularly disposed, stub axles pivoted between the intermediate member and the lower member, a forward axle having pivoted stub axles pivoted to the reach and provided with a pivoted bolster, said forward axle having a flexible frame pivoted thereto, and adjustable means coöperating between the stub axles for regulating and equalizing the oscillatory movements thereof.

7. In a device as set forth, a reach having its extreme rear end provided with a coupling device, a rear axle fixed to said reach comprising upper and lower members and an intermediate member having its outer portions angularly disposed, stub axles pivoted between the angularly disposed portions and the lower member, said stub axles having tubular extensions for spacing the angularly disposed portions and the lower member apart, a forward axle comprising upper and lower members having pivoted therebetween stub axles, said lower member of the forward axle being pivoted to the reach while the upper member is provided with a pivoted bolster to oscillate vertically and upon a plane parallel with the said forward axle, said forward axle having pivoted thereto a flexible frame, adjustable means for regulating and equalizing the oscillatory movements of the stub axles comprising an oscillatory bar having a plurality of apertures pivoted approximately the center of the reach and provided with rod connections with the said stub axles, said rod connections being bolted to the oscillatory bar so as to allow their ends to be adjusted in any one of the plurality of apertures, and rods of considerable length connected to said oscillatory bar and adapted to be connected to the axle of the forward wheels of an engine, as and for the purposes specified.

In testimony whereof I have signed my name to this specificaion in the presence of two subscribing witnesses.

ARTHUR F. CLARK.

Witnesses:
JOHN L. HAUSEWORTH,
ISADORE STONE.